US008872920B2

(12) United States Patent
Kakinami

(10) Patent No.: US 8,872,920 B2
(45) Date of Patent: Oct. 28, 2014

(54) CAMERA CALIBRATION APPARATUS

(75) Inventor: Toshiaki Kakinami, Nagoya (JP)

(73) Assignee: Aisin Seiki Kabushiki Kaisha, Aichi-ken (JP)

( * ) Notice: Subject to any disclaimer, the term of this patent is extended or adjusted under 35 U.S.C. 154(b) by 540 days.

(21) Appl. No.: 13/256,593

(22) PCT Filed: Dec. 18, 2009

(86) PCT No.: PCT/JP2009/071166
§ 371 (c)(1),
(2), (4) Date: Sep. 14, 2011

(87) PCT Pub. No.: WO2010/109730
PCT Pub. Date: Sep. 30, 2010

(65) Prior Publication Data
US 2012/0002057 A1 Jan. 5, 2012

(30) Foreign Application Priority Data

Mar. 26, 2009 (JP) .................................. 2009-076857
Mar. 26, 2009 (JP) .................................. 2009-076858

(51) Int. Cl.
*H04N 17/00* (2006.01)
*G06T 7/00* (2006.01)

(52) U.S. Cl.
CPC ....... *G06T 7/002* (2013.01); *G06T 2207/30208* (2013.01); *G06T 2207/30256* (2013.01); *G06T 2207/20016* (2013.01); *G06T 2207/10048* (2013.01); *G06T 2207/10012* (2013.01)
USPC ........... 348/148; 348/187; 348/188; 382/154; 382/291

(58) Field of Classification Search
CPC ........... G06T 2207/10012; G06T 2207/30256; G06T 7/002

USPC ......................................................... 348/148
See application file for complete search history.

(56) References Cited

U.S. PATENT DOCUMENTS

| 2004/0066454 | A1 | 4/2004 | Otani et al. |
| 2008/0031514 | A1 | 2/2008 | Kakinami |
| 2008/0181488 | A1* | 7/2008 | Ishii et al. ..................... 382/154 |
| 2009/0021580 | A1* | 1/2009 | Ishigami et al. .............. 348/142 |

FOREIGN PATENT DOCUMENTS

| JP | 2002-288661 A | 10/2002 |
| JP | 2004-037270 A | 2/2004 |
| JP | 2006-148745 A | 6/2006 |
| JP | 2008-187564 A | 8/2008 |

OTHER PUBLICATIONS

English translation of International Preliminary Report on Patentability for PCT/JP2009/071166, dated Oct. 27, 2011.

* cited by examiner

*Primary Examiner* — Dave Czekaj
*Assistant Examiner* — Md Haque
(74) *Attorney, Agent, or Firm* — Sughrue Mion, PLLC

(57) ABSTRACT

A captured image including a preferential calibration index arranged in an exclusive region in a first plane and a non-preferential calibration index arranged in a common region is obtained. First, the coordinate position of the preferential calibration index is detected, and then the coordinate position of the non-preferential calibration index is calculated based on the positional relationship with the detected preferential calibration index. A homography between a captured-image surface of the image surface and the first plane is calculated based on the actual coordinate positions and the calculated coordinate positions representing the coordinates of at least four points, and camera calibration is performed using the homography.

12 Claims, 11 Drawing Sheets

CAMERA CALIBRATION APPARATUS

CROSS REFERENCE TO RELATED APPLICATIONS

This application is a National Stage of International Application No. PCT/JP2009/071166 filed Dec. 18, 2009, claiming priority based on Japanese Patent Application No. 2009-076857 and Japanese Patent Application No. filed 2009-076858, both filed Mar. 26, 2009, the contents of all of which are incorporated herein by reference in their entirety.

INDUSTRIAL FIELD

The present invention relates to a camera calibration apparatus for performing camera calibration using a principle of the plane projective transformation.

BACKGROUND ART

A camera calibration apparatus is known as an apparatus for calibrating a camera based on the plane projective transformation for performing a calibrating operation which includes arranging planar calibration indexes having the coordinate information on at least four points in a first plane, inputting a captured-image surface of the camera including the calibration indexes as a second plane, specifying points that are present in the second plane and correspond to predetermined portions of the calibration indexes, and calculating a homography between the first plane and the second plane based on the corresponding relationships among at least four points shareably included in both the first plane and the second plane (see Patent Document 1, for example). In this apparatus, the calibration indexes are arranged in a photographing region to obtain, based on the photographed calibration indexes, the homography which is a transformation matrix representing the corresponding relationship between the coordinates of a captured image (captured-image system coordinate positions) and the coordinates of a transformed image (plane coordinate system coordinate positions). Such camera calibration is advantageous in that no adverse influence is exerted from a setting error of the camera because the corresponding coordinates are designated between the captured image and the transformed image without requiring camera external parameters or camera internal parameters and based on the calibration indexes that are actually photographed owing to the principal of the plane projective transformation.

PRIOR ART DOCUMENT

Patent Document

Patent Document: Japanese Unexamined Patent Application Publication No. 2006-148745 (paragraph 0011; FIG. 1)

SUMMARY OF THE INVENTION

Problem to be Solved by the Invention

The homography used in the camera calibration apparatus of the above-noted Patent Document 1 for projecting the captured image of each camera on a road surface can be calculated based on four or more calibration indexes whose coordinate positions are known. In order to calculate the coordinate positions of those calibration indexes in the captured-image system, it is required to detect the calibration indexes from the captured image by using the image processing technique. However, there have been disadvantages of increasing a calculating burden in image processing and increasing the cost since a high-performance calculating device is required.

An object of the present invention is to provide a technique for easily and precisely obtain the necessary number of calibration indexes from a captured image in camera calibration using a homography. Another object of the present invention is to provide a technique for easily calibrating a plurality of cameras using the homography.

Means for Solving the Problem

In order to achieve the above-noted objects, a camera calibration apparatus according the present invention comprises:

an image obtaining section for obtaining a captured image including at least four indexes having a planar preferential calibration index arranged in a specified region and a planar non-preferential calibration index arranged in a non-specified region other than the specified region, the specified region and the non-specified region being defined in a first plane in a photographing view field of a camera;

an index information storing section for determining the positional relationship between the preferential calibration index and the non-preferential calibration index in advance, and storing the coordinate positions of the preferential calibration index and the non-preferential calibration index in the first plane as actual coordinate positions;

a preferential calibration index position calculating section for calculating the coordinate position of the preferential calibration index in the image;

a non-preferential calibration index position calculating section for calculating the coordinate position of the non-preferential calibration index in the image by referring to the positional relationship and the calculated coordinate position of the preferential calibration index;

a homography calculating section for calculating a homography between a captured-image surface of the captured image and the first plane based on the actual coordinate positions and the calculated coordinate positions of the calibration indexes representing the coordinates of at least four points; and a calibration section for performing calibration of the camera by using the homography.

With this construction, the coordinate position of the preferential index arranged in the specified region in the first plane is firstly calculated based on the obtained captured image. Since the specified region is a limited region in the captured image, a processing burden is reduced compared with the case for detecting the calibration index from the entire captured image. When the coordinate position of at least one preferential calibration index is calculated, a region where the remaining calibration index, that is, the non-preferential calibration index, is present in the captured-image surface is estimated by referring to the calculated coordinate position of the preferential calibration index and the predetermined positional relationship between the preferential calibration index and the non-preferential calibration index. Exemplary information on the predetermined positional relationship includes information that the non-preferential calibration index is present in the right-side region of a straight line connecting the preferential calibration index to an optical center, or information including directivity in a pattern depicted as the preferential calibration index and indicating that the non-preferential calibration index is present in a straight line defined by the directivity. Thus, the calculated coordinate position of the non-preferential calibration index is efficiently obtained by estimating the region where the non-preferential calibration index is present. In this manner, when the calculated coordinate positions of the calibration indexes representing the coordinates of at least four points are obtained, such calculated coordinate positions are provided to the homography calculating section along with their corresponding actual coordinate positions (coordinate positions of the calibration indexes in the first plane coordinate system) for calculating the homography between the captured-image surface of the captured image and the first plane. By using the homography, camera calibration can be performed without knowing camera parameters.

According to a preferable embodiment of the present invention, the specified region is a near-side region having a short-range object distance from the camera, and the non-preferential calibration index is arranged in a far-side region having a long-range object distance from the camera. By employing such an arrangement of the calibration indexes, a region sectioned by the preferential and non-preferential indexes can define a wide area in the captured image. The image of the preferential calibration index arranged in the position near the camera in the captured image has increased image precision without using a high-quality lens, compared with the case where the index is arranged in other regions. In addition, since the original calibration indexes representing the coordinates of at least four points are distributed in as wide a range as possible in the captured image, the homography to be obtained in the end has advantageously high precision in the entire range of the captured image.

In a monitoring system using cameras, a plurality of cameras are mounted on the system to display a bird's eye view or a complete panorama image based on the captured images of the cameras in an attempt to easily grasp the circumstances of a monitored area. To this end, it is required to calibrate the plurality of cameras and provide no seam or no slip in a composite image produced by transforming and combining the captured images of the respective cameras. In order to meet such requirements, a camera calibration apparatus in which the present invention is applied to camera calibration of a plurality of cameras, comprises:

an image obtaining section for obtaining a captured image from each camera, the captured image including calibration indexes representing the coordinates of at least four indexes having a planar preferential calibration index arranged in an exclusive region defined in a first plane in a photographing view field of each camera and a planar non-preferential calibration index arranged in a common region shared with the captured image of an adjacent camera in the first plane;

an index information storing section for storing the coordinate positions of the preferential calibration index and the non-preferential calibration index in the first plane as actual coordinate positions;

a preferential calibration index position calculating section for calculating the coordinate position of the preferential calibration index;

a non-preferential calibration index position calculating section for calculating the coordinate position of the non-preferential calibration index by referring to the actual coordinate positions of the calibration indexes and the calculated coordinate position of the preferential calibration index;

a homography calculating section for calculating a homography for the captured image of each camera between a captured-image surface of each camera and the first plane based on the actual coordinate positions and the calculated coordinate positions of the calibration indexes representing the coordinates of at least four points; and a calibration section for performing calibration of the plurality of cameras by using the homography calculated for each camera. With such a construction of the camera calibration apparatus for the plurality of cameras, the coordinate value of the calibration index in the planar image photographed in the region having the shared camera view field agrees with the actual value owing to the properties of the homography. Therefore, no seam or no slip occurs in the composite image combining the transformed images obtained by transforming the image of each camera in the coordinate system determined as a reference to the bird's eye view image.

In particular, taking into consideration that a plurality of cameras are mounted on a recent movable body such as an automobile to display a bird's eye view or a complete panorama image based on the captured images of the cameras in an attempt to allow the operator including the driver to easily grasp the circumstances of the movable body, it is preferable that the camera is a camera mounted on a movable body, the first plane is a road surface, and each of the calibration indexes is a marker as a pattern depicted in the road surface. Similarly, it is preferable that each of the calibration indexes is a marker arranged parallel to the road surface and having a planar pattern. More particularly, the calibration indexes dealt with in the present invention may adopt various forms suitable for calculating the homography including not only a marker directly depicted on the road surface with paint but also a maker painted on a plate having substantially the same level as the road surface and placed on the road surface.

Further, it is also preferable that the camera includes a front camera having a photographing view field of a forward region of the movable body, a right-side camera having a photographing view field of a right-side region of the movable body, a left-side camera having a photographing view field of a left-side region of the movable body, and a rear camera having a photographing view field of a rearward region of the movable body. It should be noted that, when the camera calibration is performed in a factory, the floor of the factory acts as the road surface.

In another mode of the camera calibration apparatus of the present invention, the preferential calibration index includes planar near-side calibration indexes representing the coordinates of at least four points arranged in a near-side region defined within the first plane and having a short-range object distance from the camera; the non-preferential calibration index includes at least one planar far-side calibration index arranged in a far-side region having a long-range object distance from the camera; the homography calculating section includes a preliminary homography calculating section and a precise homography calculating section; the preferential calibration index position calculating section is formed as a far-side index position estimating section for estimating the position of the far-side calibration index in the captured image by using a preliminary homography; the non-preferential calibration index position calculating section is formed as a far-side index position calculating section for calculating the coordinate position of the far-side calibration index in the captured image as a calculated coordinate position by using the estimated position; the preliminary homography calculating section calculates the preliminary homography between a captured-image surface of the captured image and the first plane based on the actual coordinate positions and the calculated coordinate positions of the near-side calibration indexes representing the coordinates of at least four points; and the precise homography calculating section calculates a precise homography between the captured-image surface of the captured image and the first plane based on the calculated coordinate positions of selected indexes representing the coordinates of at least four points selected from the near-side calibration indexes and the far-side index calculated by the far-side index position calculating section and their corresponding actual coordinate positions.

With such a construction, the coordinate positions of the calibration indexes representing the coordinates of at least four points arranged in the specified region in the vicinity of the camera in the capture image system are calculated. In this calculation process, since the calibration indexes are arranged close to each other in an extremely limited area, the processing time is reduced compared with the case for detecting the calibration indexes representing the coordinates of four points from the entire captured image. Further, those indexes are arranged in a position near the camera, which increases the image precision of the calibration indexes and also increases the detecting precision. Since the homography is calculated based on the coordinate positions of the four calibration indexes in the captured-image coordinate system that are calculate in this way and the actual coordinate positions in the first plane, the camera calibration can be performed based on such a homography. On the other hand, since the source of the homography is the four calibration indexes arranged close to each other in the limited area near the camera, it would be difficult to precisely transform the entire captured-image system coordinates to the first plane, and in particular, positional displacement would occur in a region remote from the camera. Therefore, according to the present invention, such a homography is regarded as the preliminary homography to estimate the position of the far-side calibration index arranged in advance in a position remote from the camera in the captured image. Then, the far-side calibration index is detected within the estimated narrow region to calculate the precise homography of high precision based on the coordinate positions of the four calibration indexes including the far-side calibration index in the captured-image coordinate system and the actual coordinate positions in the first plane. By performing the camera calibration using the precise homography, the entire captured image can be calibrated without positional displacement.

In order to increase the precision of the precise homography as much as possible, it is preferable to determine in advance the arrangement of the near-side calibration indexes and the far-side calibration index so that the selected calibration indexes used for calculating the precise homography are selected to allow a region sectioned by the selected calibration indexes to define a wide area in the captured-image surface.

Further, it is preferable that the image obtaining section obtains the captured image from each of a plurality of cameras having different photographing view fields and each having a common region shared with the captured image of an adjacent camera in the first plane; the common region includes at least one common calibration index; and the calibration section performs calibration of the adjacent camera based on the positional relationship of the common calibration index in the captured image of the adjacent camera that is obtained by using the precise homography. With such a construction, the coordinate value of the calibration index in the road-surface image photographed in the region having the shared camera view field agrees with the actual value owing to the properties of the homography. Therefore, no seam or no slip occurs in the composite image combining the transformed images obtained by transforming the image of each camera in the coordinate system determined as a reference to the bird's eye view image.

In the calibration for the plurality of cameras as well, in order to provide the precise homography for each camera with higher precision, it is important that the near-side calibration indexes are arranged in a region having a short-range object distance in the vicinity of a photographing center line in the captured image of each camera, and the common calibration index is arranged in a region having a long-range object distance in a peripheral portion of the captured image of each camera.

In addition, as a specific construction of the camera calibration apparatus for a camera system in which all the circumstances of the mobile body are covered by four cameras to display the bird's eye view or compete panorama image, it is proposed that the camera is a camera mounted on a movable body; the camera includes a front camera having a photographing view field of a forward region of the movable body, a right-side camera having a photographing view field of a right-side region of the movable body, a left-side camera having a photographing view field of a left-side region of the movable body, and a rear camera having a photographing view field of a rearward region of the movable body; the first plane is a road surface; the near-side calibration indexes are four markers depicted on the road surface; and the far-side calibration index includes two markers depicted on the road surface and located apart from each other and from the near-side calibration indexes. When the camera calibration is performed in a factory, the floor of the factory acts as the road surface. It should be noted that the marker depicted on the road surface includes not only a marker directly depicted on the road surface with paint but also a maker painted on a plate having substantially the same level as the road surface and placed on the road surface.

The present invention is intended for not only the camera calibration apparatus noted above but also a camera calibration program for achieving the camera calibration function of such an apparatus by a computer, and a camera calibration method defining the flow of control by such a program. For instance, one of the camera calibration methods for solving the above-noted problems comprises:

an image obtaining step for obtaining a captured image including at least four indexes having a planar preferential calibration index arranged in a specified region and a planar non-preferential calibration index arranged in a non-specified region other than the specified region, the specified region and the non-specified region being defined in a first plane in a photographing view field of a camera;

a preferential calibration index position calculating step for calculating the coordinate position of the preferential calibration index in the image;

a non-preferential calibration index position calculating step for calculating the coordinate position of the non-preferential calibration index in the image by referring to the predetermined positional relationship between the preferential calibration index and the non-preferential calibration index, and the calculated coordinate position of the preferential calibration index;

a homography calculating step for calculating a homography between a captured-image surface of the captured image and the first plane based on the actual coordinate positions and the calculated coordinate positions of the calibration indexes representing the coordinates of at least four points; and a calibration step for performing calibration of the camera by using the homography.

The camera calibration method comprising the above-noted steps also achieves the functions and effects obtained by the above-described camera calibration apparatus and may employ the various additional characteristic features noted above. The above is also applicable to the camera calibration program having substantially the same characteristic features as the camera calibration method.

In connection with the technique described above for performing the camera calibration by using the two homographies, that is, the preliminary homography and the precise homography, a typical camera calibration apparatus of this type comprises:

an image obtaining section for obtaining a captured image including planar near-side calibration indexes representing at least four coordinates arranged in a near-side region having a short-range object distance from a camera, and at least one far-side calibration index arranged in a far-side region having a long-range object distance from the camera, the near-side region and the far-side region being defined in a first plane in a photographing view field of the camera;

an index information management section for managing the coordinate positions of the near-side calibration indexes and the far-side calibration index in the first plane as actual coordinate positions;

a near-side index position calculating section for calculating the coordinate positions of the near-side calibration indexes in the captured image as calculated coordinate positions;

a preliminary homography calculating section for calculating a preliminary homography between a captured-image surface of the captured image and the first plane based on the actual coordinate positions and the calculated coordinate positions of the near-side calibration indexes representing the coordinates of at least four points;

a far-side index position estimating section for estimating the position of the far-side calibration index in the captured image by using the preliminary homography;

a far-side calibration index position calculating section for calculating the coordinate position of the far-side calibration index in the captured image as a calculated coordinate position by using the estimated position;

a precise homography calculating section for calculating a precise homography between the captured-image surface of the captured image and the first plane based on the calculated coordinate positions of selected indexes representing the coordinates of at least four points selected from the near-side calibration indexes calculated by the near-side index position calculating section and the far-side index calculated by the far-side index position calculating section and their corresponding actual coordinate positions; and a calibration section for performing calibration of the camera by using the precise homography.

As a matter of course, the present invention is also intended for a camera calibration program for achieving the above-noted camera calibration function by a computer, and a camera calibration method defining the flow of control by such a program. Such a camera calibration method comprises:

an image obtaining step for obtaining a captured image including planar near-side calibration indexes representing at least four coordinates arranged in a near-side region having a short-range object distance from a camera, and at least one far-side calibration index arranged in a far-side region having a long-range object distance from the camera, the near-side region and the far-side region being defined in a first plane in a photographing view field of the camera;

a near-side index position calculating step for calculating the coordinate positions of the near-side calibration indexes in the captured image as calculated coordinate positions;

a preliminary homography calculating step for calculating a preliminary homography between a captured-image surface of the captured image and the first plane based on the actual coordinate positions and the calculated coordinate positions of the near-side calibration indexes representing the coordinates of at least four points;

a far-side index position estimating step for estimating the position of the far-side calibration index in the captured image by using the preliminary homography;

a far-side calibration index position calculating step for calculating the coordinate position of the far-side calibration index in the captured image as a calculated coordinate position by using the estimated position;

a precise homography calculating step for calculating a precise homography between the captured-image surface of the captured image and the first plane based on the calculated coordinate positions of selected indexes representing the coordinates of at least four points selected from the near-side calibration indexes calculated by the near-side index position calculating section and the far-side index calculated by the far-side index position calculating section and their corresponding actual coordinate positions; and a calibration step for performing calibration of the camera by using the precise homography.

The camera calibration method comprising the above-noted steps also achieves the functions and effects obtained by the above-described camera calibration apparatus and may employ the various additional characteristic features noted above. The above is also applicable to the camera calibration program having substantially the same characteristic features as the camera calibration method.

MODE FOR CARRYING OUT THE INVENTION

Figure 1:
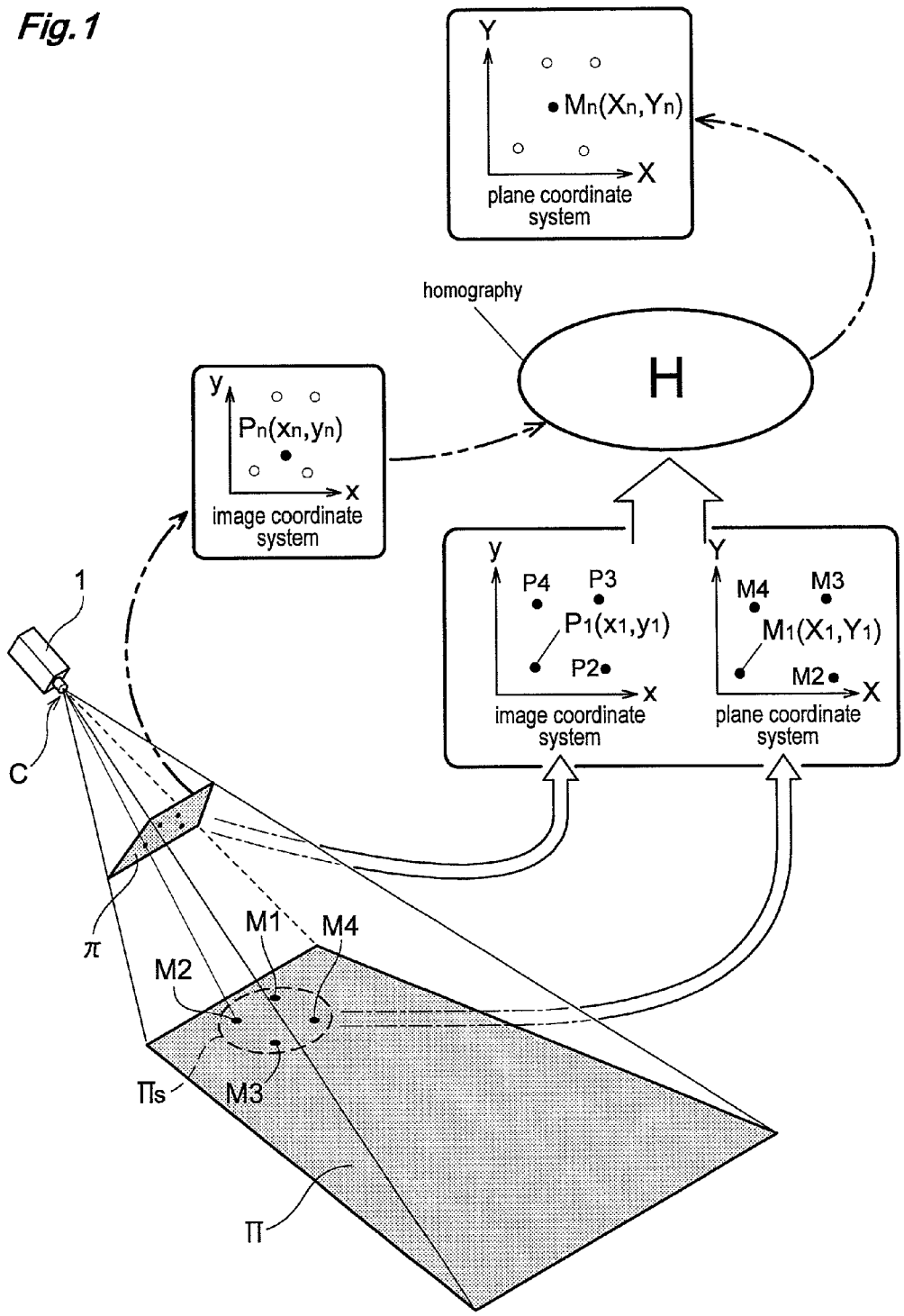
FIG. 1 is an illustrative view describing a fundamental principle of the plane projective transformation used in the present invention.

A fundamental principle of the plane projective transformation used in the present invention will be described hereinafter in reference to FIG. 1. A first plane Π is provided in a photographing view field of a camera having a photographing center (also acting as an optical center, here) C. Calibration indexes (shown in dots in FIG. 1) M1, M2, M3 and M4 representing four coordinates for camera calibration are provided in the first plane. Images of the four calibration indexes M1, M2, M3 and M4 are reflected on a captured-image surface π of the camera. Coordinate positions of points P1, P2, P3 and P4 of those images in a coordinate system (an x-y coordinate system here) can be calculated by image processing. Since the calibration indexes are arranged as previously determined, the coordinate positions of the calibration indexes M1, M2, M3 and M4 arranged in the first plane Π (shown in dots in FIG. 1) in a coordinate system (X-Y coordinate system here) set in the first plane Π are already known.

It is known from projection geometry that, if four points whose positions in a plane in a three-dimensional space are known are used as the calibration indexes, four points of a captured image can be associated with the corresponding calibration indexes, respectively, that is, a homography: H (plane projective transformation) can be calculated to restore the four points in the captured-image surface as the four points in the original plane in the three-dimensional space even if external parameters of the camera are unknown. Although any detailed description therefor is omitted here, reference should be made to Japanese Unexamined Patent Application Publication No. 2006-148745; and Sato, Jun, Oct. 10, 2001, first edition, third impression: *Computer Vision*; Corona Publishing Co., Ltd, for example. What is specifically emphasized here is that any external parameters of the camera representing information on the position and posture of the camera in the three-dimensional space including the height or tilting angle of the camera are not required but may be unknown. As shown in FIG. 1, the first plane coordinate positions M1 (X1,Y1), M2 (X2,Y2), M3 (X3,Y3) and M4 (X4,Y4) of the four calibration indexes are associated with the calculated captured-image coordinate positions P1 (x1, y1), P2 (x2, y2), P3 (x3, Y3) and P4 (x4, y4) of the four calibration indexes in the captured image to calculate the homography H. Once the homography H is calculated, a selected point Pn (xn, yn) of the captured-image coordinate system can be transformed to a coordinate position Mn (Xn, Yn) in the first plane.

A principle of a camera calibration apparatus according to the present invention using the above-noted fundamental principle will be described hereinafter in reference to FIG. 2.

Here, a specified region having a short-range object distance from the camera 1 is determined as an exclusive region Πm in the first plane Π in the photographing view field of the camera 1, while part of a region other than the specified region having a long-range object distance from the camera 1 is determined as a common region Πc. This common region Πc is suitable, when a large area of the first plane Π is covered by a plurality of cameras, for a region that is shared between images captured by adjacent cameras. On the other hand, the exclusive region Πm is suitable, when a large area of the first plane Π is covered by a plurality of cameras, for a region that is photographed optimally by only one camera. The common region Πc includes two separate zones largely spaced from each other in a transverse direction of a camera optical axis. In order to calculate the homography, a plane region Π 1 in the first plane Π fallen within the view field of one camera requires at least four planar preferential calibration indexes. Thus, two preferential calibration indexes (referred to simply as preferential indexes hereinafter) M1 and M2 are arranged in the exclusive region Πm while two non-preferential calibration indexes (referred to simply as non-preferential indexes hereinafter) M3 and M4 are arranged in the common region Πc. It should be noted that the term "index" is simply used when there is no need to particularly distinguish the preferential index from the non-preferential index and that the calibration index is collectively denoted as numeral 9. The coordinate position of each index in the plane coordinate system in the first plane Π is a known value as an actual coordinate position of the index.

When the partial first plane Π 1 is photographed by the camera 1, its captured image is obtained in the captured-image surface π. In the captured image, the coordinate positions in the captured-image coordinate system of the two preferential indexes M1 and M2 arranged in the exclusive region Πm are firstly calculated as calculated coordinate positions through the image processing technique. Here, since those two preferential indexes M1 and M2 are arranged in the exclusive region Πm representing the specified region having the short-range object distance and defining a transverse central region, the photographed images of the indexes are also located in a specified region in the captured image, which reduces a calculating burden in search processing.

When the preferential indexes M1 and M2 are detected, a region in the captured-image surface it where the non-preferential calibration indexes M3 and M4 are present is estimated by referring to the predetermined positional relationships between the calculated coordinate positions of the preferential calibration indexes M1 and M2 and the non-preferential calibration indexes M3 and M4. For instance, if it is defined that the non-preferential calibration index M3 is present in the right-side region of a perpendicular bisector between the preferential calibration indexes M1 and M2 while the non-preferential calibration index M4 is present in the left-side region thereof, the region to be searched is halved. Further, if it is defined that the non-preferential calibration index M4 is present on a straight line connecting the optical center C to the preferential calibration index M1 while the non-preferential calibration index M3 is present on a straight line connecting the optical center C to the preferential calibration index M2, the region to be searched is further limited. In this way, by estimating the regions where the non-preferential calibration indexes M3 and M4 that have not yet detected are present, the calculated coordinate positions of the non-preferential indexes M3 and M4 can be effectively obtained.

When the indexes M1, M2, M3 and M4 obtained in this way are determined to define as large an area as possible in the first plane Π 1, the precision of the homography calculated based on those indexes can be improved.

The homography H between the captured-image surface π of the camera 1 and the first plane Π can be calculated based on the calculated coordinate positions P1(x1, y1), P2(x2, y2), P3(x3, Y3) and P4(x4, y4) of the preferential indexes M1 and M2 and the non-preferential indexes M3 and M4 in the captured image system as well as the coordinate positions M1(X1, Y1), M2(X2, Y2), M3(X3, Y3) and M4(X4, Y4) in the plane coordinate system (or road-surface coordinate system) representing the actual coordinate positions thereof in the first plane Π.

Figure 2:
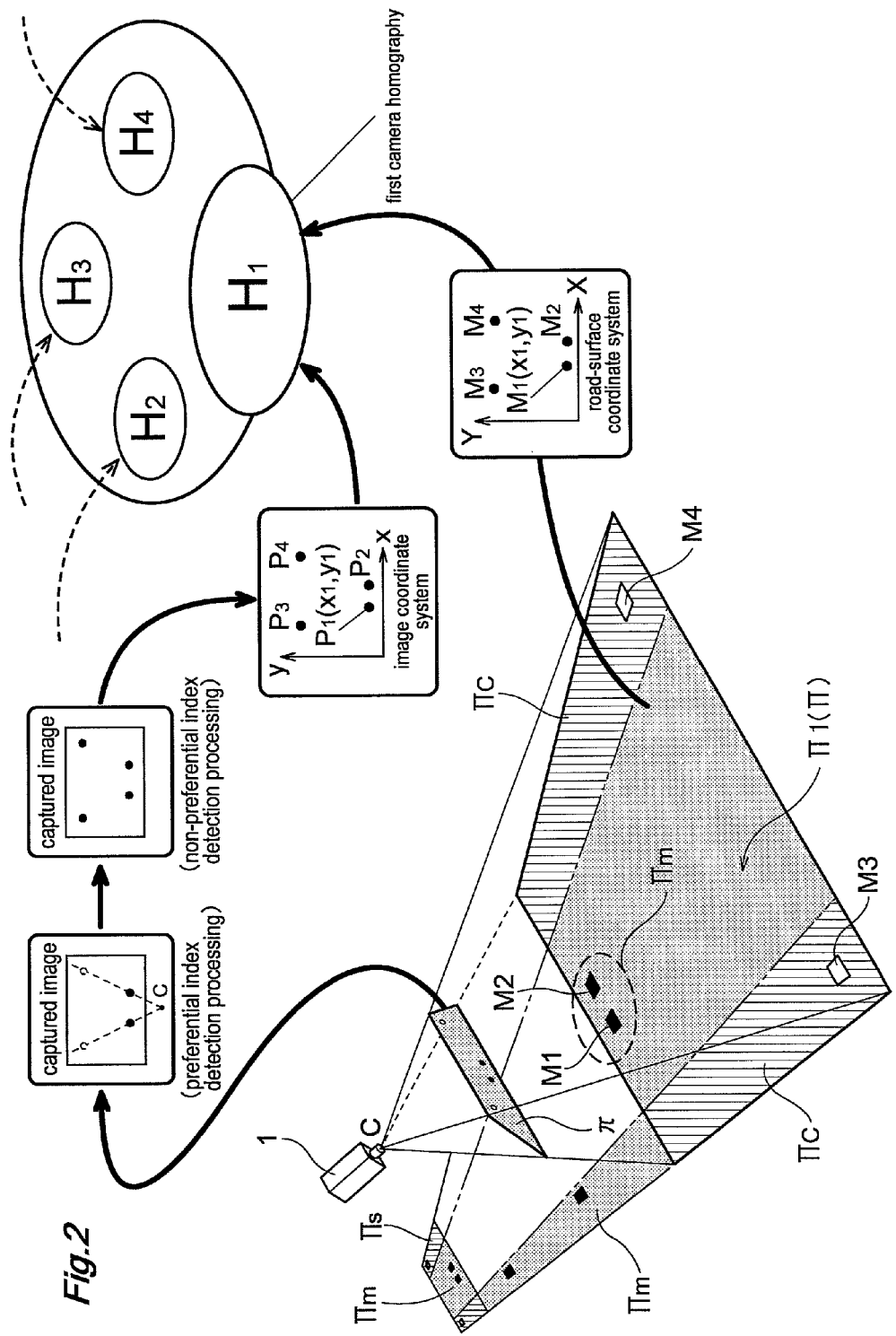
FIG. 2 is an illustrative view describing a fundamental principle of a camera calibration apparatus of the present invention.

As schematically shown in FIG. 2, if the first plane Π is covered by four cameras 1, four homographies H1, H2, H3 and H4 are calculated. Calibration of the camera 1 is performed by using the homographies that are structured in this way, as a result of which camera calibration is achieved in which the first plane Π such as a road surface properly corresponds to an image displayed in a monitor based on the captured image without requiring information on not only internal parameters but also external parameters of the camera 1.

One of the embodiments to which the camera calibration apparatus of the present invention is applied in order to calibrate a plurality of on-board cameras 1 mounted on a vehicle as an example of a movable body will be described hereinafter.

Figure 3:
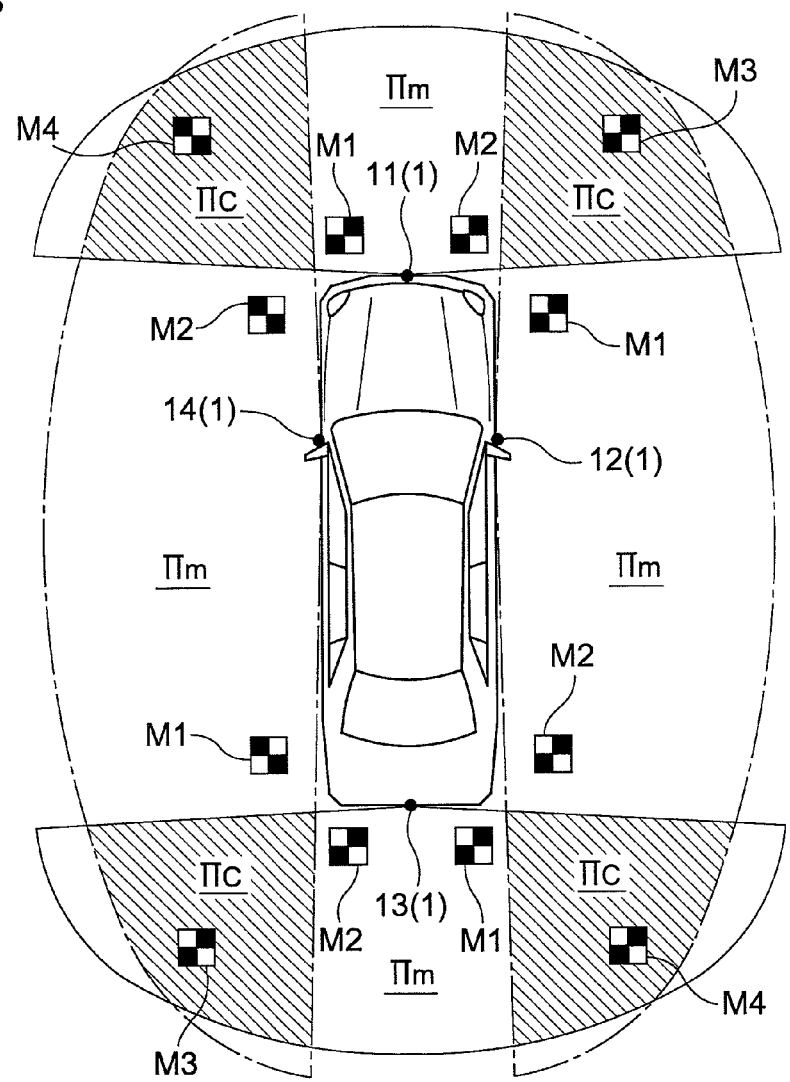
FIG. 3 is an illustrative view describing relationships among calibration indexes arranged in a road surface, a vehicle, and camera view fields.

FIG. 3 is an explanatory illustration showing the relationships among the vehicle at a predetermined position in a road surface representing a first plane Π, calibration indexes depicted on the road surface, and camera view fields. The cameras includes a first camera 11 having a view field for a forward region of the vehicle, a second camera 12 having a view field for a right-side region of the vehicle, a third camera 13 having a view field for a rearward region of the vehicle, and a fourth camera 14 having a view field for a left-side region of the vehicle. It should be noted that the term "camera 1" is typically used when there is no need to specify each camera.

Figure 4:
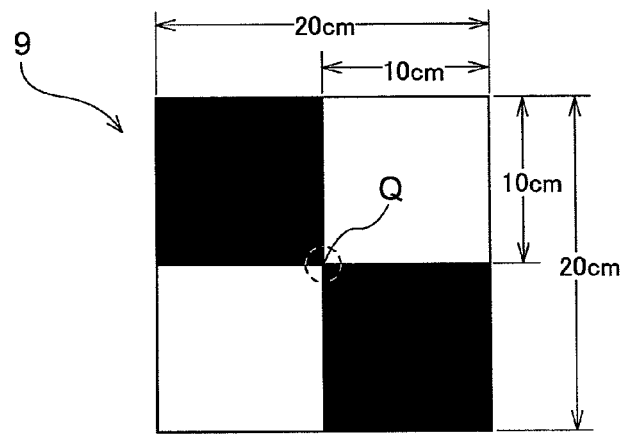
FIG. 4 is a top plan view showing a planer calibration index.

The road surface fallen within the view field of each camera 1 includes an exclusive region Πm located in a central area near the vehicle and common regions Πc located in opposite lateral sides remote from the vehicle. The common regions Πc are shared regions in the road surface fallen within the view fields of adjacent cameras 1. Two preferential indexes M1 and M2 are arranged in the exclusive region Πm in positions near the camera 1 while one non-preferential index M3 or M4 is arranged in each of the lateral opposite common regions Πc in a position remote from the camera 1. All of the preferential indexes M1 and M2 and the non-preferential indexes M3 and M4 are the same indexes that are collectively denoted as numeral 9 as shown in FIG. 4 representing a black-and-white checkered pattern that is also referred to as a maker. The checkered pattern of the index 9 is calibrated by four rectangles, that is, two white rectangles and two black rectangles. The coordinate position of a central point Q of the pattern corresponds to a coordinate position of the index 9 that is actually used. Thus, edge detection is performed on the checkered pattern in order to detect the position of the point Q in image processing, and an intersection point of perpendicular lines that are obtained in the detection is regarded as the point Q. The index per se may be directly depicted on the road surface, or may be depicted on a surface of a plate member which is movable to a desired position.

The image captured by the first camera 11 includes the images of the preferential indexes M1 and M2 arranged in the exclusive region Πm and the images of the non-preferential indexes M3 and M4 arranged in the common regions Πc shared with the adjacent second camera 12 and fourth camera 14. Similarly, the image captured by the second camera 12 includes the preferential indexes M1 and M2 and the non-preferential indexes M3 and M4, the image captured by the third camera 13 includes the preferential indexes M1 and M2 and the non-preferential indexes M3 and M4, and the image captured by the fourth camera 14 includes the preferential indexes M1 and M2 and the non-preferential indexes M3 and M4.

Figure 5:
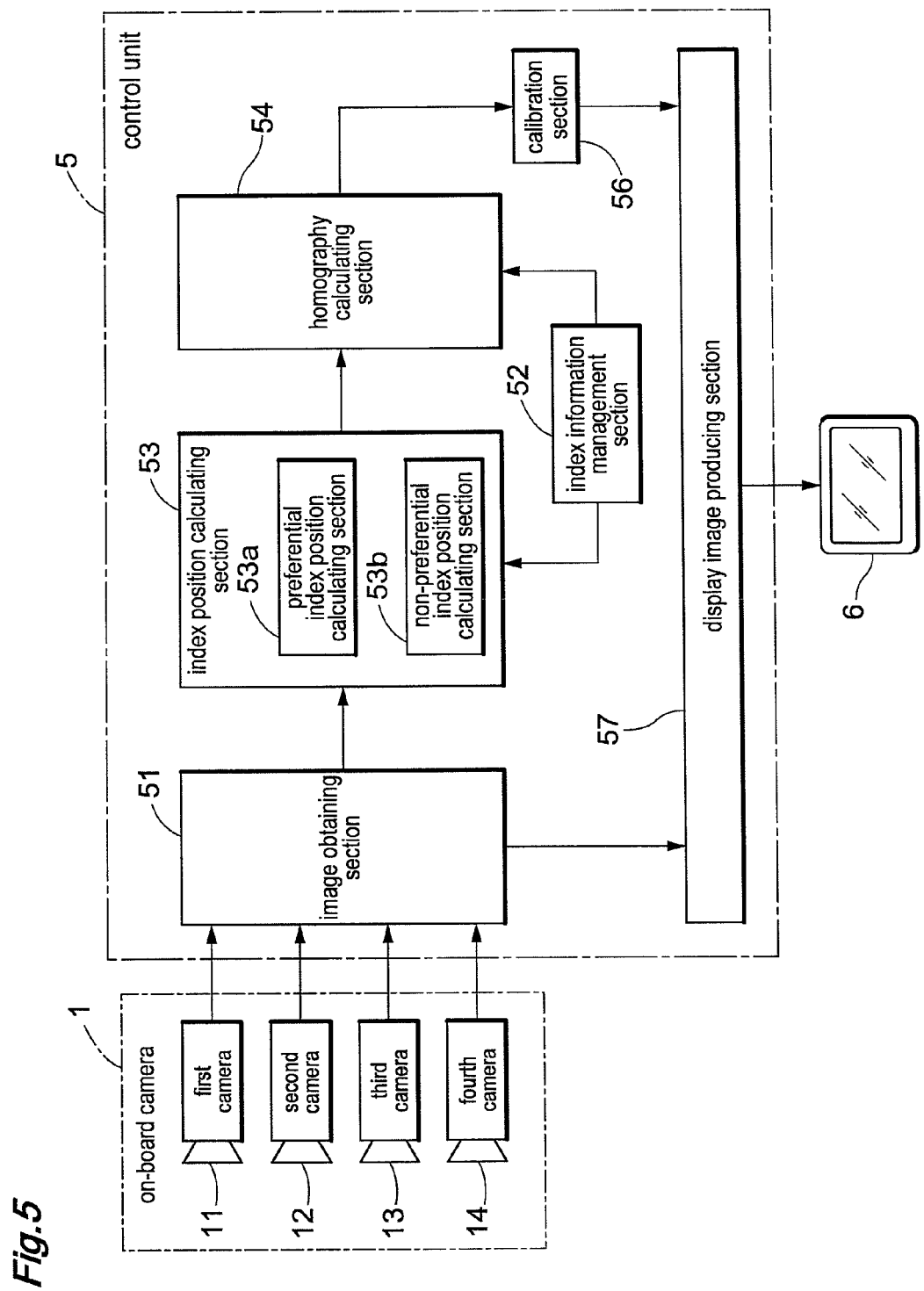
FIG. 5 is a functional block diagram showing functions built in a control unit of the camera calibration apparatus.

In order to perform the cameral calibration that has been described using FIG. 2 in the relationships among the vehicle, calibration indexes and camera view fields, the camera calibration apparatus mounted on the vehicle comprises a control unit 5 for building up a functional part and a monitor 6 connected to the control unit 5 as schematically shown in FIG. 5. The four on-board cameras 1 noted above are connected to the control unit 5 for data transmission to transmit the captured image in each photographing view field to the control unit 5.

The functional part structured in the control unit 5, particularly related to the present invention, includes an image obtaining section 51, index information management section 52, index position calculating section 53, homography calculating section 54, calibration section 56, and display image producing section 57. The image obtaining section 51 selectively obtains the captured images transmitted from the respective cameras 1 and performs necessary preprocessing to develop them in a working memory. The index information management section 52 serves to manage the road surface coordinate positions representing the actual coordinate positions of the calibration indexes 9 arranged in the road surface Π for the respective camera view fields and including the preferential indexes M1 and M2 and the non-preferential indexes M3 and M4, and to provide the functional part, on demand, with the road-surface coordinate positions of the calibration indexes 9 to be processed. It is preferable to store the road-surface coordinate positions in a nonvolatile memory when the stop position of the vehicle is fixed and the respective calibration indexes 9 are depicted or set in predetermined positions. When the positions of the calibration indexes 9 relative to the vehicle in the road surface would be shifted, the index information management section 52 may manage the road-surface coordinate positions of the calibration indexes 9 inputted each time.

Further, the index information management section 52 also stores information on the positional relationships between the preferential indexes M1 and M2 and the non-preferential indexes M3 and M4 as noted above. The information is provided to the index position calculating section 53 as need demands in order to limit the region to be searched for detecting the non-preferential indexes after the preferential indexes M1 and M2 are detected.

The index position calculating section 53 serves to obtain the coordinate positions of the calibration indexes 9 in the captured image developed in the working memory in the captured-image coordinate as calculated coordinate positions. In this process, in order to detect the point Q shown in FIG. 4, edge detection filtering is performed for detecting a horizontal line and a vertical line, and RANSAC is used for obtaining the straight lines. The intersection point of the straight lines is established as the calculated coordinate position. The index position calculating section 53 has two functions; one is a preferential-index position calculating section 53a for calculating the coordinate positions of the preferential calibration indexes, the other is a non-preferential-index position calculating section 53b for calculating the coordinate positions of the non-preferential indexes in reference to the information on the positional relationships which is provided from the index position calculating section 53 as noted above.

The homography calculating section 54 serves to calculate the homography between the captured-image surface π of the captured image and the road surface Π based on the road-surface coordinate positions of at least four calibration indexes 9 and the calculated coordinate positions of the calibration indexes 9 that have been calculated by the index position calculating section 53.

The calibration section 56 determines calibration data for each camera 1 based on the precise homographies H1, H2, H3 and H4 between the captured-image surface π and the road surface Π that have been calculated by the homography calculating section 54 for the respective cameras 1. The display image producing section 57 serves to transform the captured images from the respective cameras 1 to displaying images to be displayed in the monitor 6 by referring to the calibration data determined by the calibration section 56, thereby to provide the user with the displaying images that are not inconsistent among the captured images of the respective cameras 1.

Figure 6:
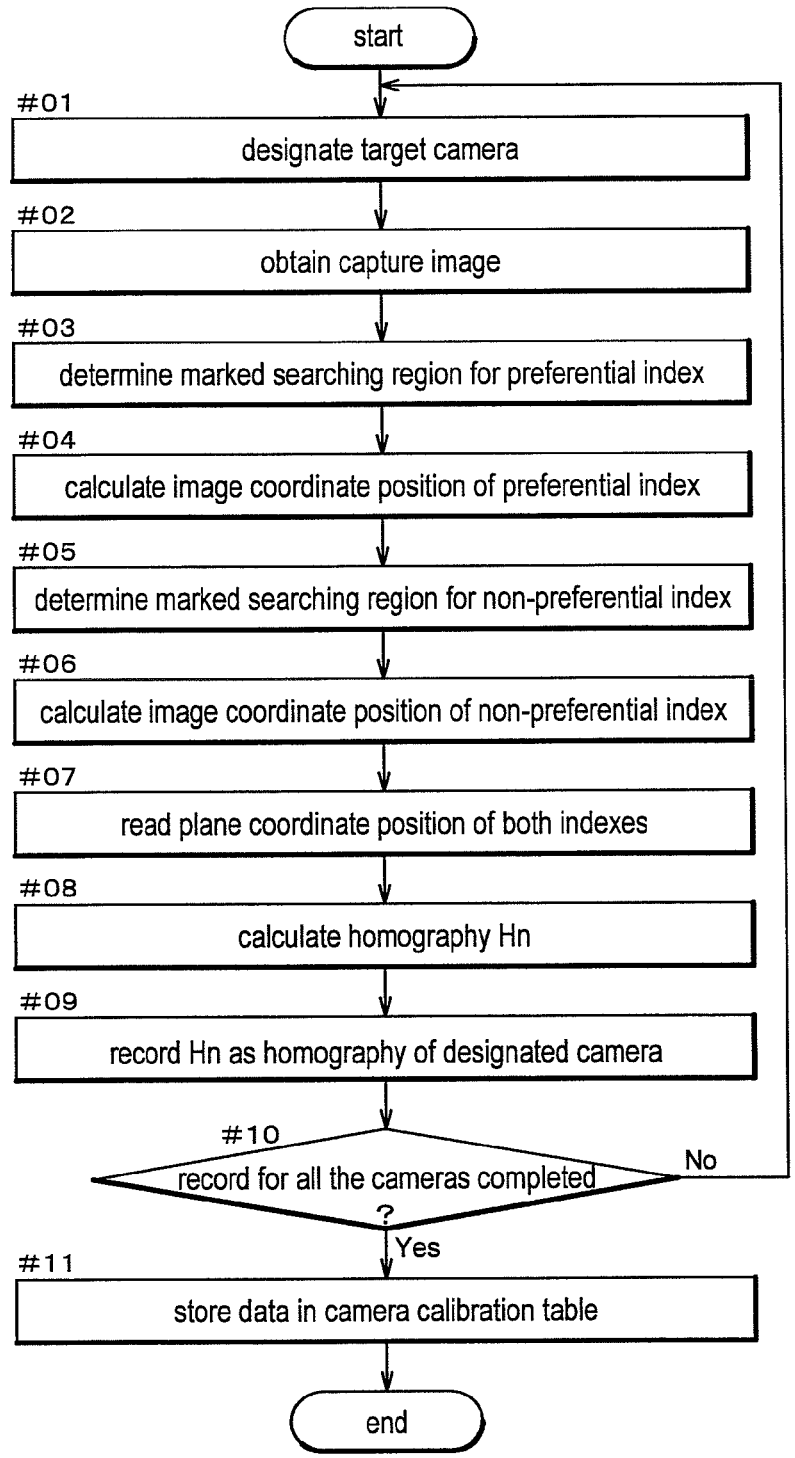
FIG. 6 is a flowchart exemplifying a flow of calibration processing for a plurality of cameras.

The flow of calibration processing for the plurality of cameras 1 performed by the camera calibration apparatus formed as noted above will be described hereinafter in reference to a flowchart shown in FIG. 6.

In the first place, a camera 1 to be firstly calibrated is designated (#01), and a captured image of the designated camera 1 is taken to the working memory (#02). Reference is made to the positional information on the exclusive region within the view field of the designated camera 1 to determine a marked searching region for the preferential indexes arranged in the exclusive region relative to the captured image (#03). Two preferential indexes are detected from the determined marked searching region to calculate their image coordinate positions (#04). The road-surface coordinate positions representing the coordinate positions of the calculated two preferential indexes in the road-surface coordinate system as well as the information on the positional relationships between the preferential indexes and the corresponding non-preferential indexes are obtained from the index information management section 52 to determine a marked searching region for the non-preferential indexes from estimated positions of the non-preferential indexes in the captured-image coordinate system (#05). Two non-preferential indexes are detected from the determined marked searching region to calculate their image coordinate positions (#09). The road-surface coordinate positions representing the coordinate positions of the calculated two non-preferential indexes in the road-surface coordinate system are read from the index information management section 52 (#10). The homography Hn (n denotes a camera number; 1, 2, 3 or 4) is calculated using the calculated coordinate positions and the road-surface coordinate positions of the two preferential indexes and non-preferential indexes that have been obtained in the above-noted manner (#08). The calculated homography Hn is recorded as the homograph H1 of the designated camera 1 (#09). Next, whether or not the precise homographies of all of the four cameras 1 are recorded is checked (#10). If the homography of any camera has not been recorded (arrow "No" in #10), the routine returns to step #01 for repetition of the above steps. If the precise homographies Hn of all the cameras 1 have been recorded (arrow "Yes" in #10), the calibration data for each camera 1 is recorded in a camera calibration table from the homographies H1, H2, H3 and H4 of all the cameras 1 to complete the camera calibration routine (#11).

Alternative Embodiment

Next, another camera calibration apparatus that is different from the apparatus in the foregoing embodiment will be described in which two homographies, that is, a preliminary homography and a precise homography, are used for camera calibration. It should be noted that the same reference signs are assigned to the elements having substantially the same functions as those in the foregoing embodiment.

Firstly, a principle of the camera calibration apparatus according to the alternative embodiment will be described in reference to FIG. 7.

A near-side region Πs having a short-range object distance from a camera 1 and a far-side region Πw having a long-range object distance from the camera 1 are defined in a first plane Π in the photographing view field of the camera 1. Four planar near-side calibration indexes (referred to simply as near-side indexes hereinafter) M11, M12, M13 and M14 are arranged in the near-side region Πs, while two planar far-side calibration indexes (referred to simply as far-side indexes hereinafter) M15 and M16 that are largely spaced from each other in the transverse direction of a camera optical axis are arranged in the far-side region Πw. Here, again, it should be noted that the term "index" is simply used when there is no need to particularly distinguish the near-side index from the far-side index, and that the calibration index is collectively denoted as numeral 9. The coordinate position of each index in the plane coordinate system in the first plane Π is a known value as an actual coordinate position of the index.

When the first plane Π is photographed by the camera 1, its captured image is obtained in a captured-image surface π. The coordinate positions of the four near-side indexes in the captured image in the captured-image coordinate system are calculated as calculated image positions through the image processing technique. Here, since those four near-side indexes M11, M12, M13 and M14 are arranged in the near-side region Πs defining an extremely narrowed region that is a transverse central region and having the short-range object distance, photographed images of the indexes are also located in an extremely limited region in the captured image, which reduces a calculating burden in search processing.

The homography Hs between the captured-image surface π and the first plane Π can be calculated based on the above-noted actual coordinate positions and calculated image positions of the four near-side indexes. Since the homography Hs is calculated using the four calculated image positions that are arranged close to each other in the captured image, it is referred to as the preliminary homography. The positional relationship between a selected point of the first plane Π and a point in the captured-image surface π is obtained by using the preliminary homography Hs, as a result of which the positions of the far-side indexes M15 and M16 in the captured-image coordinate system can be generally estimated. Reference to the estimated coordinate positions facilitates a search for the captured images of the far-side indexes M15 and M16, and the calculated image positions of the far-side indexes M15 and M16 can be speedily obtained. Four indexes are selected of all the indexes M11, M12, M13, M14, M15 and M16 that have been obtained in the above-noted manner for defining as large an area as possible in the first plane Π. In FIG. 7, for example, if the near-side indexes M11 and M12 and the far-side indexes M15 and M16 are selected, the largest area can be defined in the first plane Π.

Thus, the homography Hp between the captured-image surface π and the first plane Π is obtained based on the actual coordinate positions and calculated coordinate positions of the selected near-side indexes M11 and M12 and the far-side indexes M15 and M16. Since the homography Hp is calculated by using the four calculated image positions that are scattered in a wide range in the captured image, the precision in the entire area becomes greater than in the preliminary homography Hs. Thus, the homography Hp is referred to as the precise homography.

Calibration of the camera 1 is performed by using the precise homography Hp that has been structured in the above-noted manner, as a result of which camera calibration can be achieved in which the first plane Π such as the road surface properly corresponds to the displayed image of the monitor based on the captured image without requiring the information not only on the internal parameters but also the external parameters.

Another embodiment to which the camera calibration apparatus of the present invention is applied in order to calibrate a plurality of on-board cameras 1 mounted on a vehicle as an example of a movable body will be described hereinafter.

Figure 8:
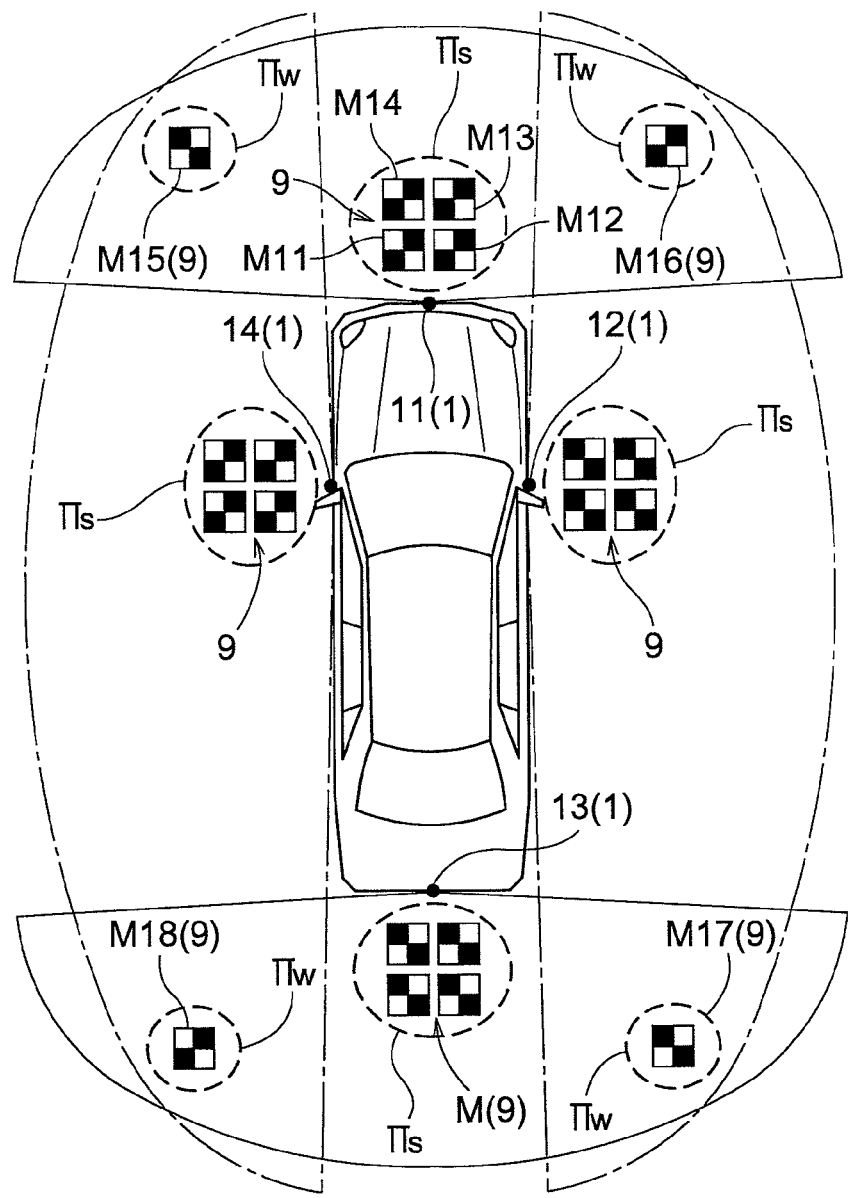
FIG. 8 is an illustrative view describing relationships among calibration indexes arranged in a road surface, a vehicle, and camera view fields.

FIG. 8 is an explanatory illustration showing the relationships among the vehicle at a predetermined position in a road surface representing a first plane Π, calibration indexes depicted on the road surface, and camera view fields. The cameras includes a first camera 11 having a view field for a forward region of the vehicle, a second camera 12 having a view field for a right-side region of the vehicle, a third camera 13 having a view field for a rearward region of the vehicle, and a fourth camera 14 having a view field for a left-side region of the vehicle. It should be noted that the term "camera 1" is typically used when there is no need to specify each camera.

The road surface fallen within the view field of each camera 1 includes a near-side region Πs located in a central area near the vehicle and far-side regions 11w located in opposite lateral sides remote from the vehicle. The far-side regions 11w are common regions in the road surface fallen within the view fields of adjacent cameras 1. In each near-side region Πs are arranged near-side indexes M11, M12, M13 and M14 that are collectively denoted as numeral 9 as shown in FIG. 4 representing a black-and-white checkered pattern that is also referred to as a maker. The checkered pattern of the index 9 is calibrated by four rectangles, that is, two white rectangles and two black rectangles. The coordinate position of a central point Q of the pattern corresponds to a coordinate position of the index 9 that is actually used. Thus, edge detection is performed on the checkered pattern in order to detect the position of the point Q in image processing, and an intersection point of perpendicular lines that are obtained by the detection is regarded as the point Q.

One far-side index M15, M16, M17 or M18 is depicted in each of the far-side regions (common regions) Πw. Those far-side indexes have a similar pattern. The index per se may be directly depicted on the road surface, or may be depicted on a surface of a plate member which is movable to a desired position. In any case, the image photographed by the first camera 11 includes the images of the near-side indexes M11, M12, M13 and M14 exclusively captured by the first camera 11 and the images of the far-side indexes M15 and M16 shared with the adjacent second camera 12 or fourth camera 14. Similarly, the image photographed by the second camera 12 includes the exclusively captured near-side indexes M11, M12, M13 and M14 and the shared far-side indexes M16 and M17, the image photographed by the third camera 13 includes the exclusively captured near-side indexes M11, M12, M13 and M14 and the shared far-side indexes M17 and M18, and the image photographed by the fourth camera 14 includes the exclusively captured near-side indexes M11, M12, M13 and M14 and the shared far-side indexes M18 and M15. Thus, each of the far-side indexes M15, M16, M17 and M18 functions as a common calibration index that is shareably photographed by both of the adjacent cameras.

Figure 7:
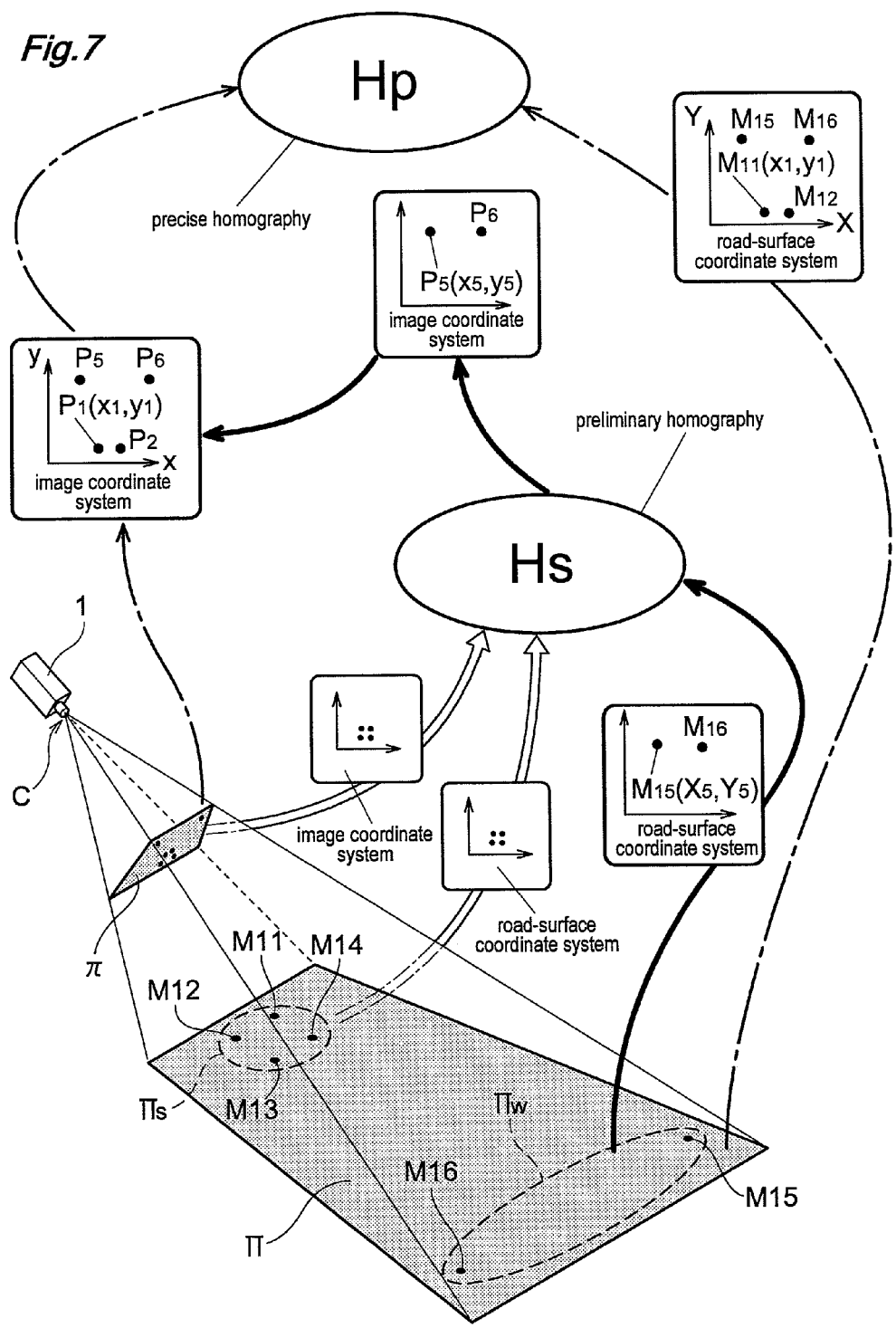
FIG. 7 is an illustrative view describing a fundamental principle of the camera calibration apparatus of the present invention.
Figure 9:
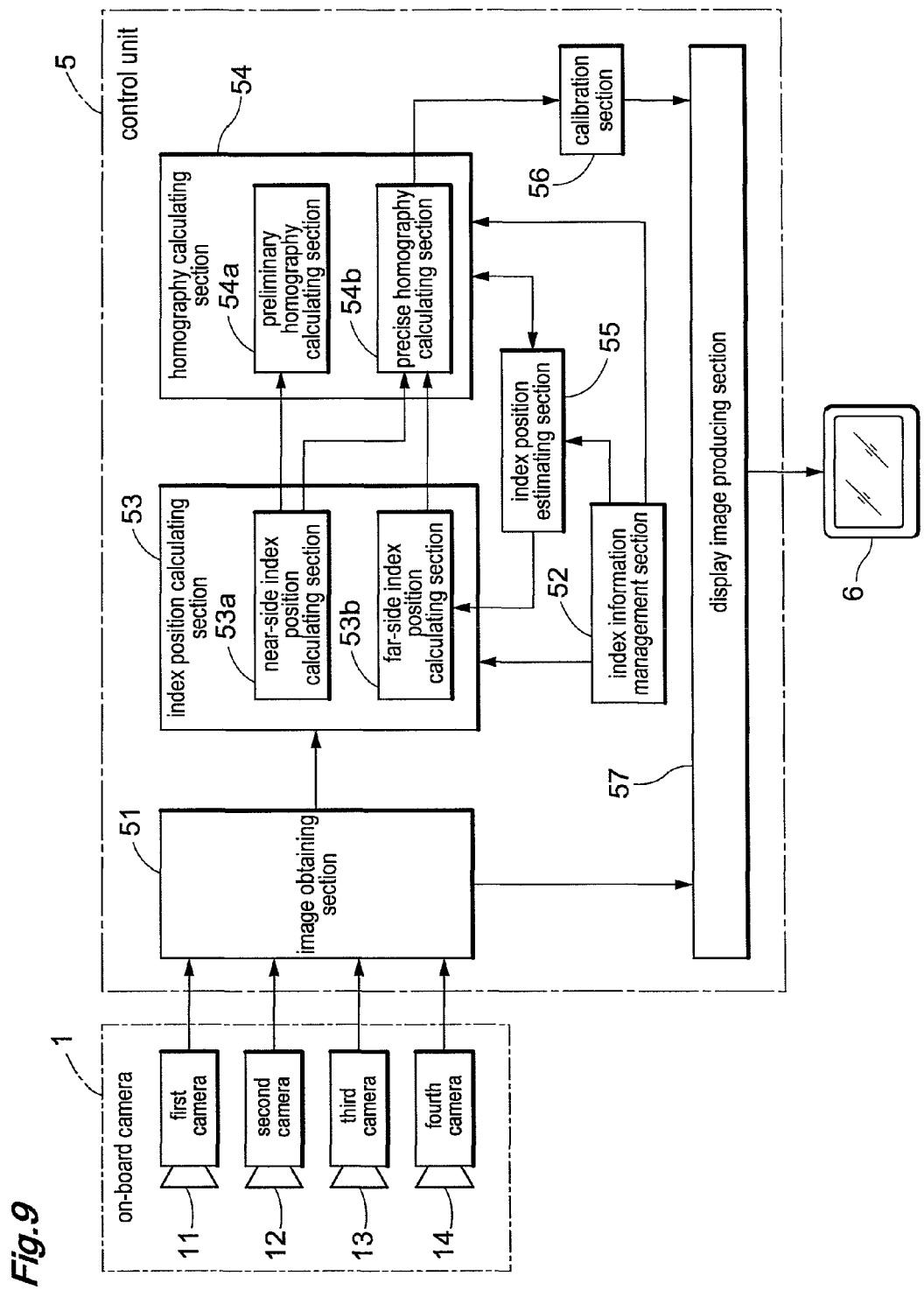
FIG. 9 is a functional block diagram showing functions built in a control unit of the camera calibration apparatus.

In order to perform cameral calibration that has been described using FIG. 7 in the relationships among the vehicle, calibration indexes and camera view fields, the camera calibration apparatus mounted on the vehicle comprises a control unit 5 for building up a functional part and a monitor 6 connected to the control unit 5 as schematically shown in FIG. 9. The four on-board cameras 1 noted above are connected to the control unit 5 for data transmission to transmit the captured image in each photographing view field to the control unit 5.

The functional part structured in the control unit 5, particularly related to the present invention, includes an image obtaining section 51, index information management section 52, index position calculating section 53, homography calculating section 54, index position estimating section 55, calibration section 56, and display image producing section 57. The image obtaining section 51 selectively obtains the captured images transmitted from the respective cameras 1 and performs necessary preprocessing to develop them in a working memory. The index information management section 52 serves to manage the road-surface coordinate positions representing the actual coordinate positions of the calibration indexes 9 arranged on the road surface Π for the respective camera view fields and including the near-side indexes and the far-side indexes, and to provide the functional part, on demand, with the road-surface coordinate positions of the calibration indexes 9 to be processed. It is preferable to store the road-surface coordinate positions in a nonvolatile memory when the stop position of the vehicle is fixed and the respective calibration indexes 9 are depicted or set in predetermined positions. When the positions of the calibration indexes 9 relative to the vehicle in the road surface would be shifted, the index information management section 52 may manage the road-surface coordinate positions of the calibration indexes 9 inputted each time.

The index position calculating section 53 serves to obtain the coordinate positions of the calibration indexes 9 in the captured image developed in the working memory in the captured-image coordinate as calculated coordinate positions. In this process, in order to detect the point Q shown in FIG. 4, edge detection filtering is performed for detecting a horizontal line and a vertical line, and RANSAC is used for obtaining the straight lines. The intersection points of the straight lines are established as the calculated coordinate positions. As described in more detail later, the index position calculating section 53 has two functions; one is a near-side-index position calculating section 53a for calculating the coordinate positions of the near-side calibration indexes as the calculated coordinate positions, the other is a far-side-index position calculating section 53b for calculating the coordinate positions of the far-side calibration indexes as the calculated coordinate positions.

The homography calculating section 54 serves to calculate a homography between a captured-image surface $\pi$ and the road surface Π based on the road-surface coordinate positions and the calculated coordinate positions of at least four calibration indexes 9. The homography calculating section 54 has a function for calculating two homographies. More particularly, the homography calculating section 54 includes a preliminary homography calculating section 54a for calculating a preliminary homography Hs between the captured-image surface $\pi$ and the road surface Π based on the road-surface coordinate positions and the calculated coordinate positions of at least four calibration indexes 9, and a precise homography calculating section 54b for calculating a precise homography Hp between the captured-image surface $\pi$ and the road surface Π based on the calculated coordinate positions of at least four indexes selected from the near-side indexes calculated by the near-side-index position calculating section 53a and the far-side indexes calculated by the far-side-index position calculating section 53b, and their road-surface coordinate positions corresponding to the calculated coordinate positions.

The index position estimating section 55 serves to estimate the positions of the far-side indexes in the captured-image coordinate system by applying the road-surface coordinate positions of the far-side indexes read from the index information management section 52 to the preliminary homography Hs. The far-side-index position calculating section 53b calculates the coordinate positions of the far-side calibration indexes by referring to the estimated regions estimated by the index position estimating section 55 as target regions to be detected.

The calibration section 56 determines calibration data based on the precise homography Hp (Hp1, Hp2, Hp3, Hp4) between the captured-image surface π and the road surface Π that has been calculated by the precise homography calculating section 54a for each camera 1. The display image producing section 57 serves to transform the captured images from the respective cameras 1 to displaying images to be displayed in the monitor 6 by referring to the calibration data determined by the calibration section 56 in order to provide the user with the displaying images that are not inconsistent among the captured images of the respective cameras 1.

Figure 10:
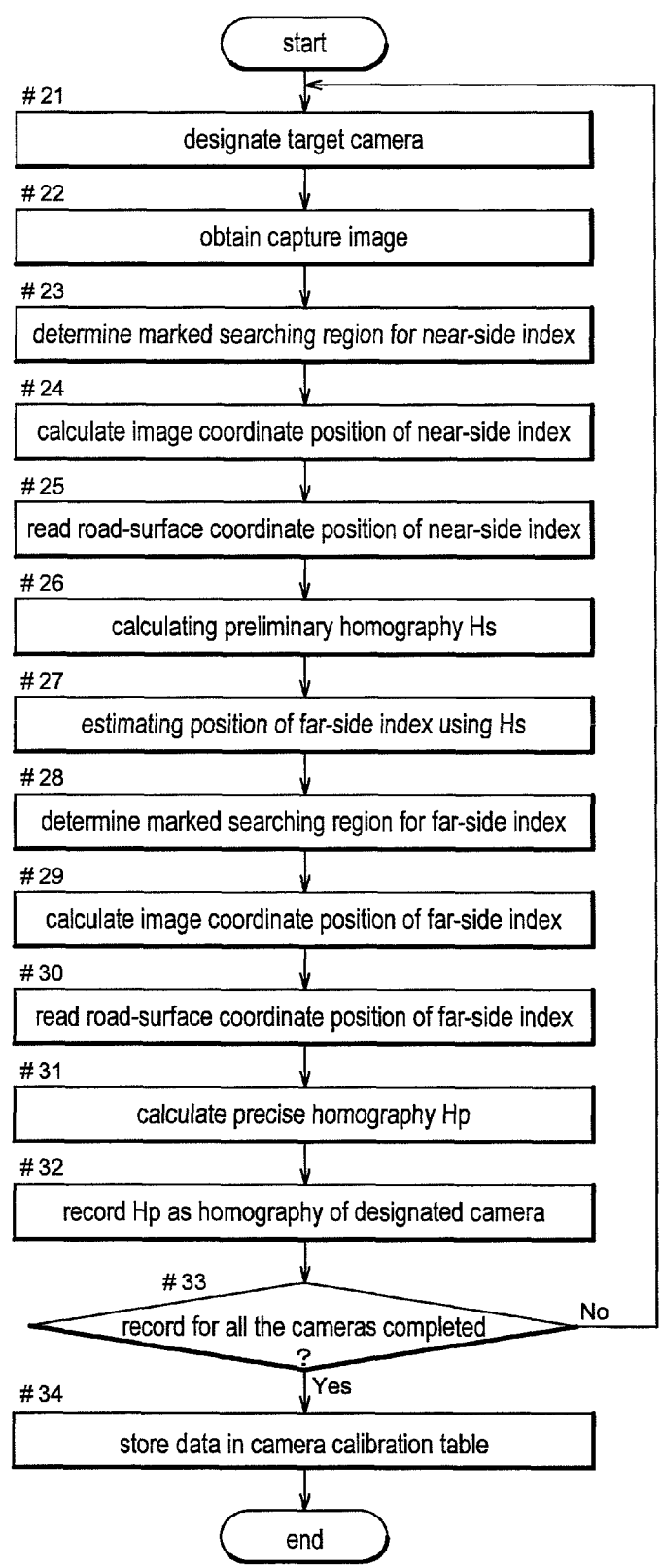
FIG. 10 is a flowchart exemplifying a flow of calibration processing for a plurality of cameras.

The flow of calibration processing for the plurality of cameras 1 performed by the camera calibration apparatus formed as noted above will be described hereinafter in reference to a flowchart shown in FIG. 10.

In the first place, a camera 1 to be firstly calibrated is designated (#21), and a captured image of the designated camera 1 is taken to the working memory (#22). Reference is made to the positional information of the near-side region captured within the view field of the designated camera 1 to determine a marked searching region for the near-side indexes arranged in the near-side region relative to the captured image (#23). Four near-side indexes are detected from the determined marked searching region to calculate their image coordinate positions (#24). The calculated road-surface coordinate positions representing the coordinate positions of the four near-side indexes in the road-surface coordinate system are read form the index information management section 52 (#25). The preliminary homography Hs is calculated by using the calculated coordinate positions and the road-surface coordinate positions of the four near-side indexes (#26). The road-surface coordinate positions of the far-side indexes arranged in the far-side regions fallen within the view field of the designated camera 1 are read from the index information management section 52 and provided to the preliminary homography Hs, thereby to estimate the positions of those far-side indexes in the captured-image coordinate system (#27). A marked searching region is determined for detecting the far-side indexes in the captured-image based on the estimated positions (#28). Two far-side indexes are detected from the determined marked searching region to calculate their captured-image coordinate positions (#29). The calculated road-surface coordinate positions representing the coordinate positions of the two far-side indexes in the road-surface coordinate system are read from the index information management section 52 (#30). The precise homography Hp is calculated by using the calculated coordinate positions and the road-surface coordinate positions of the far-side indexes and the two near-side indexes that are selected from the four near-side indexes and located farther from the far-side indexes (#31). The calculated precise homography Hp is recorded as the homography of the designated camera 1 (#32). Next, whether or not the precise homographies Hp of all the four cameras 1 are recorded is checked (#33). If the homography of any camera has not been recorded (arrow "No" in #33), the routine returns to step #02 for repetition of the above-noted steps. If the precise homographies Hp of all the cameras 1 have been recorded (arrow "Yes" in #33), the calibration data for the respective cameras 1 is recorded in a camera calibration table from the homographies Hp (Hp1, Hp2, Hp3, Hp4) of all the cameras 1 to complete the camera calibration routine (#34).

Modified Embodiment for Planar Calibration Index

Exemplary planer calibration indexes having patterns that are different from the pattern of the planar calibration index 9 shown in FIG. 4 will be described hereinafter.

Figure 11:
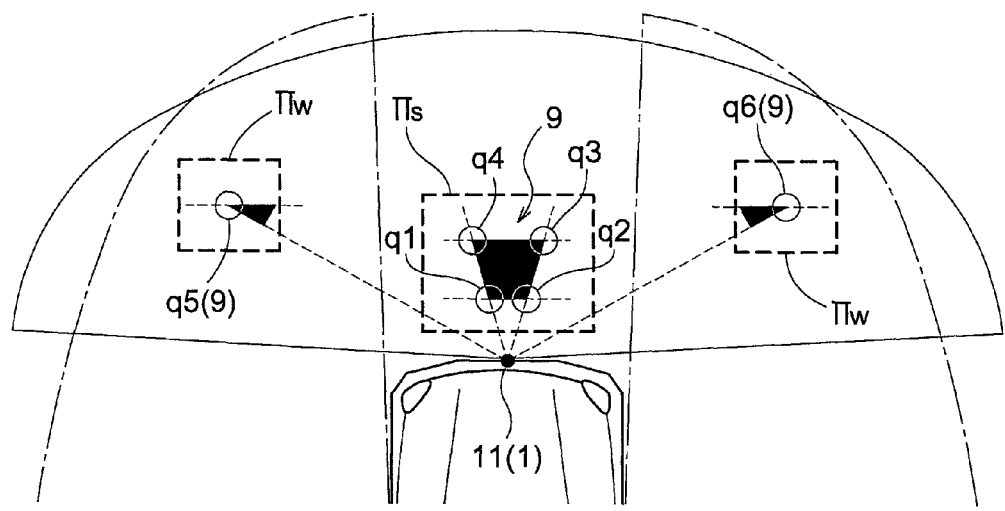
FIG. 11 is a top plan view showing a planer calibration index in another embodiment.

(1) Calibration indexes shown in FIG. 11 include a preferential index having a trapezoid painted in black (not limited to black as long as the index is distinguishable from the circumstances in image processing), and a non-preferential index having a triangle painted in black. The trapezoid forming the preferential index is defined by two straight lines radially extending from the optical center of the camera with the same radiation angle, and two parallel straight lines perpendicular to the optical axis of the camera (line vertically extending from the camera in FIG. 11). The four corner points of the trapezoid represent four calibration index points q1, q2, q3 and q4. Those four calibration index points q1, q2, q3 and q4 are obtained by detecting the boundary sides of the trapezoid through edge detection and then calculating the intersection points of the detected four boundary sides. The triangle forming the non-preferential index is defined by one radial straight line extending from the optical center of the camera toward a far-side region, one straight line perpendicular to the optical axis of the camera, and one straight line that is selectively determined Calibration index point q5 or q6 is obtained by detecting two boundary sides of the triangle through transverse edge detection and then calculating the intersection point of the detected two boundary sides.

Figure 12:
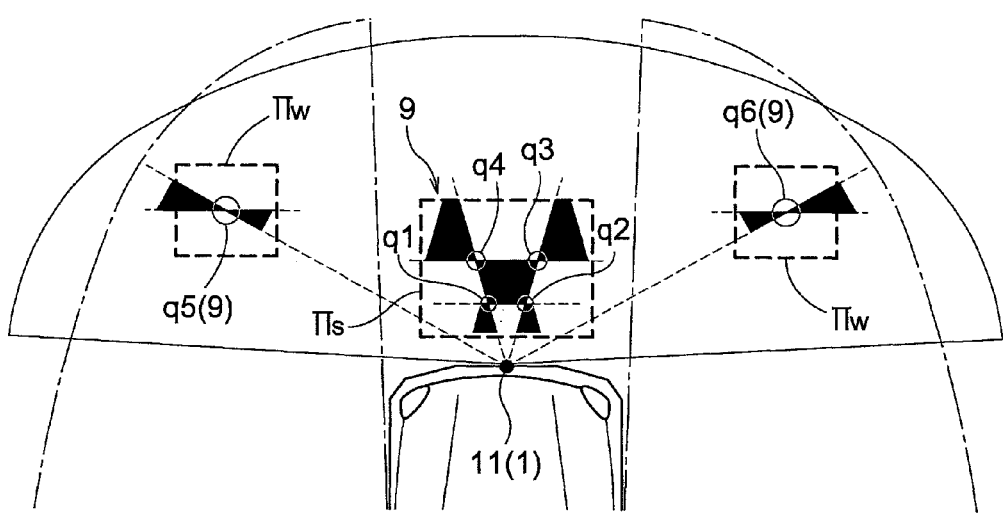
FIG. 12 is a top plan view showing a planer calibration index in a further embodiment.

(2) If a high-quality camera is not used, the position of an image may be displaced depending on the brightness of the object. In such a case, there is a possibility that the straight line that is applied after having being detected through edge detection may be set in a position that is displaced from the actual position. In order to eliminate such a disadvantage, the above-noted displacement may be canceled by complementary shading patterns in the calibration indexes as shown in FIG. 12. More particularly, unlike the calibration indexes shown in FIG. 11, the pattern of the preferential index substantially has a single main trapezoid defined by two radial straight lines and two parallel straight lines and four dummy trapezoids similar to the main trapezoid that are painted in black and defined in positions rotated by 180° from the respective apexes of the main trapezoid. The pattern of the non-preferential index has a dummy triangle arranged in the opposite side of the apex of the triangle representing the non-preferential index shown in FIG. 11. In other words, the complementary shading patterns are achieved by providing the dummy trapezoids and dummy triangle each sharing the reference lines of the main trapezoid and main triangle as the calibration indexes.

Figure 13:
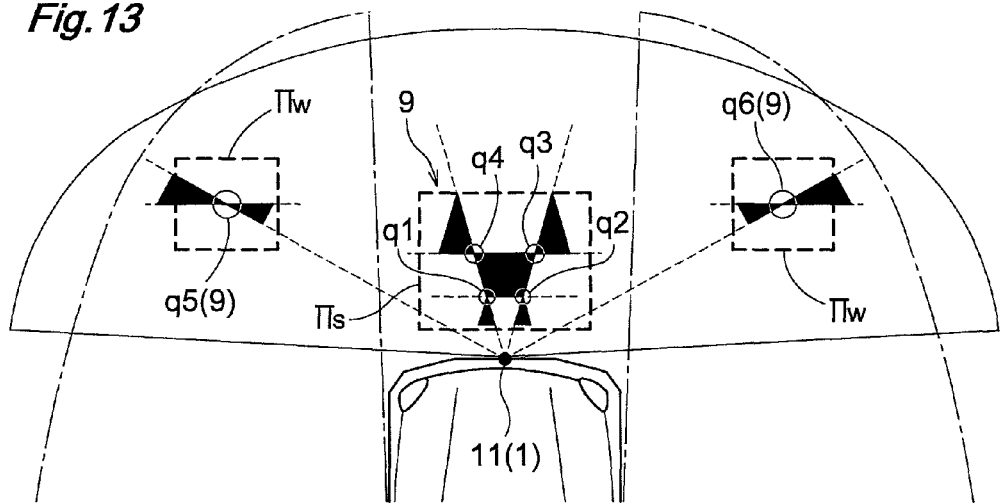
FIG. 13 a top plan view showing a planer calibration index in a still further embodiment.
Figure 14:
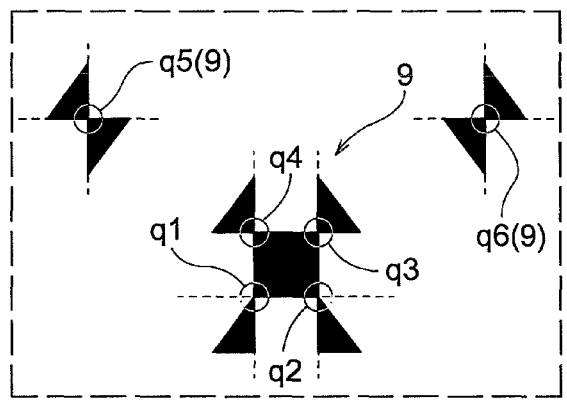
FIG. 14 is a top plan view showing a capture image of the planer calibration index of FIG. 13.

(3) The calibration indexes shown in FIG. 13 are similar to the calibration indexes shown in FIG. 12 in which a trapezoid or triangle, whether a dummy or not, that is located farther from the camera 1 has a larger size to provide substantially the same size of the trapezoids or triangles in the captured image. The captured image of those calibration indexes is shown in FIG. 14. As understood from FIG. 14, the radially extending straight line in the actual road surface is reflected in the captured image as a vertical line while the horizontal line is reflected as a horizontal line as it is, which extremely simplifies edge detection in image processing. This improves precision in the edge detection of each pattern, and eventually it is expected that precision of straight line detection leading to the calculation of the calibration indexes is improved.

Figure 15:
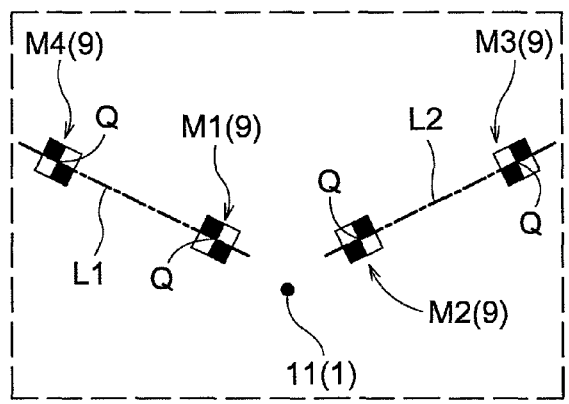
FIG. 15 is an illustrative view describing information on positional relationships between preferential calibration indexes and non-preferential calibration indexes.

One example of the information on the relationships between the preferential indexes and the non-preferential indexes will be described in reference to FIG. 15. In this example, two preferential indexes M1 and M2 and two non-preferential indexes M3 and M4 are illustrated as the calibration indexes 9. Each of the calibration indexes 9 has the black-and-white checkered pattern shown in FIG. 4. As described above, two straight lines that are perpendicular to each other are obtained by edge detection of the checkered pattern in calculating an index point Q of one of the preferential indexes M1. Here, the non-preferential index M4 is determined in advance to be located on one of the straight lines L1. Similarly, the non-preferential index M3 is determined in advance to be located on the straight line L2 that is obtained in calculating an index point Q of the other of the preferential indexes M2. This represents the information on the positional relationships between the preferential indexes and the non-preferential indexes in the example shown in FIG. 15, in which the checkered pattern depicted as the preferential index includes the straight line information representing the directional information. Based on such information on the positional relationships, the non-preferential indexes M3 and M4 can be efficiently detected by searching the straight lines L1 and L2 after the preferential indexes M1 and M2 are detected.

One of the specified objects of camera calibration (calibration of the camera) according to the present invention is to display the image captured by the camera 1 in the monitor 6 and, in superimposing predetermined image information (an estimated course of the vehicle provided by a known parking assist device or driving assist device for assisting the driver when parking the vehicle in a parking space or driving the vehicle backward, for example) on the captured image, to provide a precise relationship between the captured image and a superimposed image. Since the actual road-surface position can be precisely associated with the road-surface position in the captured image by camera calibration (calibration of the camera), the positional relationship between the captured image in the monitor 6 that is obtained by the camera 1 and the additional superimposed image becomes precise. More particularly, the positional relationship between the captured image and the additional superimposed image can be adjusted to be precise by amending the superimposed image leaving the captured image as it is, or the positional relationship between the captured image and the additional superimposed image can be adjusted to be precise by amending the captured image leaving the superimposed image fixed.

Further, when the actual road-surface position is precisely associated with the road-surface position in the captured image through camera calibration, the actual position of a displayed object (lanes or any objects) included in the captured image obtained by the on-board camera can be precisely specified through image processing of the captured image.

Next, some modified embodiments and preferable applications will be described hereinafter.

Modified Embodiments (1) In the first embodiment, four indexes are used in order to calculate the homography. Instead, more than four indexes may be used. Further, the number of indexes to be arranged in the exclusive region or common region may be increased to selectively use the indexes that are detectable most easily.

(2) In the alternative embodiment, the number of near-side indexes (more particularly, near-side index points) to be arranged is four. Instead, more than four near-side indexes may be arranged to selectively use the indexes that are detectable most easily. Similarly, the number of far-side indexes is not limited to two, but more than one index may be used. Further, more far-side indexes may be arranged to selectively use the indexes that are detectable most easily.

(3) Modifications are possible for the form of the calibration index in various ways other than the ways noted above. The formation of the pattern of the index is not limited to depiction using paint, but the pattern formation using an optical or illumination technique may be employed.

(4) The positional relationships between the preferential index and the non-preferential index may be determined in various ways other than the ways noted above. Such positional relationships may not necessarily be stored in a memory or the like, but may be incorporated into an algorithm of the index position calculation step.

(5) One of the specified objects of camera calibration according to the present invention is to display the image captured by the camera 1 in the monitor 6 and, in superimposing predetermined image information (an estimated course of the vehicle provided by a known parking assist device or driving assist device for assisting the driver when parking the vehicle in a parking space or driving the vehicle backward, for example) on the captured image, to provide a precise relationship between the captured image and a superimposed image. Since the actual road-surface position can be precisely associated with the road-surface position in the captured image by camera calibration, the positional relationship between the captured image in the monitor 6 that is obtained by the camera 1 and the additional superimposed image becomes precise. More particularly, the positional relationship between the captured image and the additional superimposed image can be adjusted to be precise by amending the superimposed image leaving the captured image as it is, or the positional relationship between the captured image and the additional superimposed image can be adjusted to be precise by amending the captured image leaving the superimposed image fixed.

(6) When the actual road-surface position is precisely associated with the road-surface position in the captured image through camera calibration, the actual position of a displayed object (lanes or any objects) included in the captured image obtained by the on-board camera can be precisely specified through image processing of the captured image.

INDUSTRIAL USABILITY

The present invention is applicable to all the fields in which camera calibration is required for a single camera or a plurality of cameras whose camera parameters are unknown to adjust the relationship between a captured image and a specified plane in a camera view field.

DESCRIPTION OF REFERENCE SIGNS

Π first plane (road surface)
π captured-image surface
H, H1, H2, H3, H4 homography
Hs preliminary homography
Hp precise homography
M1, M2 preferential calibration index
M3, M4 non-preferential calibration index
M11 to M14 near-side calibration index
M15, M16 far-side calibration index 9 calibration index
51 image obtaining section
52 index information management section
53 index position calculating section
54 homography calculating section
54a preliminary homography calculating section
54b precise homography calculating section
56 calibration section
57 display image producing section

The invention claimed is:

1. A camera calibration apparatus comprising:
an image obtaining section for obtaining a captured image including at least four indexes having a planar preferential calibration index arranged in a specified region and a planar non-preferential calibration index arranged in a non-specified region other than the specified region, the specified region and the non-specified region being defined in a first plane in a photographing view field of a camera;
an index information storing section for determining the positional relationship between the preferential calibration index and the non-preferential calibration index in advance, and storing the coordinate positions of the preferential calibration index and the non-preferential calibration index in the first plane as actual coordinate positions;
a preferential calibration index position calculating section for calculating the coordinate position of the preferential calibration index in the image;
a non-preferential calibration index position calculating section for calculating the coordinate position of the non-preferential calibration index in the image by referring to the positional relationship and the calculated coordinate position of the preferential calibration index;
a homography calculating section for calculating a homography between a captured-image surface of the captured image and the first plane based on the actual coordinate positions and the calculated coordinate positions of the calibration indexes representing the coordinates of at least four points; and
a calibration section for performing calibration of the camera by using the homography,
wherein the preferential calibration index is arranged in the specified region which is a near-side region having a short-range object distance from the camera, and the non-preferential calibration index is arranged in a far-side region having a long-range object distance from the camera.

2. The camera calibration apparatus as claimed in claim 1,
wherein the image obtaining section obtains the captured image from each of a plurality of cameras having different photographing view fields,
wherein the captured image from each camera includes a common region shared with the captured image of an adjacent camera and an exclusive region that is not shared in the first plane,
wherein the non-preferential calibration index is arranged in the common region while the preferential calibration index is arranged in the exclusive region, and
wherein the calibration section performs camera calibration for the plurality of cameras by using the homography calculated for each camera.

3. The camera calibration apparatus as claimed in claim 1,
wherein the camera is a camera mounted on a movable body,
wherein the first plane is a road surface, and
wherein each of the calibration indexes is a marker arranged parallel to the road surface and having a planar pattern.

4. The camera calibration apparatus as claimed in claim 1,
wherein the camera is a camera mounted on a movable body,
wherein the first plane is a road surface, and
wherein each of the calibration indexes is a marker as a pattern depicted in the road surface.

5. The camera calibration apparatus as claimed in claim 2,
wherein the camera includes a front camera having a photographing view field of a forward region of the movable body, a right-side camera having a photographing view field of a right-side region of the movable body, a left-side camera having a photographing view field of a left-side region of the movable body, and a rear camera having a photographing view field of a rearward region of the movable body.

6. The camera calibration apparatus as claimed in claim 1,
wherein the preferential calibration index includes planar near-side calibration indexes representing the coordinates of at least four points arranged in a near-side region defined within the first plane and having a short-range object distance from the camera,
wherein the non-preferential calibration index includes at least one planar far-side calibration index arranged in a far-side region having a long-range object distance from the camera,
wherein the homography calculating section includes a preliminary homography calculating section and a precise homography calculating section,
wherein the preferential calibration index position calculating section is formed as a far-side index position estimating section for estimating the position of the far-side calibration index in the captured image by using a preliminary homography,
wherein the non-preferential calibration index position calculating section is formed as a far-side index position calculating section for calculating the coordinate position of the far-side calibration index in the captured image as a calculated coordinate position by using the estimated position,
wherein the preliminary homography calculating section calculates the preliminary homography between a captured-image surface of the captured image and the first plane based on the actual coordinate positions and the calculated coordinate positions of the near-side calibration indexes representing the coordinates of at least four points, and
wherein the precise homography calculating section calculates a precise homography between the captured-image surface of the captured image and the first plane based on the calculated coordinate positions of selected indexes representing the coordinates of at least four points selected from the near-side calibration indexes and the far-side index calculated by the far-side index position calculating section and their corresponding actual coordinate positions.

7. The camera calibration apparatus as claimed in claim 6,
wherein the selected calibration indexes used for calculating the precise homography are selected to allow a region sectioned by the selected calibration indexes to define a wide area in the captured-image surface.

8. The camera calibration apparatus as claimed in claim 7,
wherein the camera is a camera mounted on a movable body,
wherein the first plane is a road surface, and wherein each of the calibration indexes is a marker as a pattern depicted in the road surface.

9. The camera calibration apparatus as claimed in claim 7,
wherein the image obtaining section obtains the captured image from each of a plurality of cameras having different photographing view fields and each having a common region shared with the captured image of an adjacent camera in the first plane,
wherein the common region includes at least one common calibration index, and
wherein the calibration section performs calibration of the adjacent camera based on the positional relationship of the common calibration index in the captured image of the adjacent camera that is obtained by using the precise homography.

10. The camera calibration apparatus as claimed in claim 7, wherein the near-side calibration indexes are arranged in a region having a short-range object distance in the vicinity of a photographing center line in the captured image of each camera, and the common calibration index is arranged in a region having a long-range object distance in a peripheral portion of the captured image of each camera.

11. The camera calibration apparatus as claimed in claim 9,
wherein the camera is a camera mounted on a movable body,
wherein the camera includes a front camera having a photographing view field of a forward region of the movable body, a right-side camera having a photographing view field of a right-side region of the movable body, a left-side camera having a photographing view field of a left-side region of the movable body, and a rear camera having a photographing view field of a rearward region of the movable body,
wherein the first plane is a road surface,
wherein the near-side calibration indexes are four markers depicted on the road surface, and
wherein the far-side calibration index includes two markers depicted on the road surface and located apart from each other and from the near-side calibration indexes.

12. A camera calibration apparatus comprising:
an image obtaining section for obtaining a captured image including planar near-side calibration indexes representing at least four coordinates arranged in a near-side region having a short-range object distance from a camera, and at least one far-side calibration index arranged in a far-side region having a long-range object distance from the camera, the near-side region and the far-side region being defined in a first plane in a photographing view field of the camera;
an index information management section for managing the coordinate positions of the near-side calibration indexes and the far-side calibration index in the first plane as actual coordinate positions;
a near-side index position calculating section for calculating the coordinate positions of the near-side calibration indexes in the captured image as calculated coordinate positions;
a preliminary homography calculating section for calculating a preliminary homography between a captured-image surface of the captured image and the first plane based on the actual coordinate positions and the calculated coordinate positions of the near-side calibration indexes representing the coordinates of at least four points;
a far-side index position estimating section for estimating the position of the far-side calibration index in the captured image by using the preliminary homography;
a far-side calibration index position calculating section for calculating the coordinate position of the far-side calibration index in the captured image as a calculated coordinate position by using the estimated position;
a precise homography calculating section for calculating a precise homography between the captured-image surface of the captured image and the first plane based on the calculated coordinate positions of selected indexes representing the coordinates of at least four points selected from the near-side calibration indexes calculated by the near-side index position calculating section and the far-side index calculated by the far-side index position calculating section and their corresponding actual coordinate positions; and
a calibration section for performing calibration of the camera by using the precise homography.

* * * * *